(No Model.)

R. L. WALKER.
LINING FOR FURNACES.

No. 360,494.                    Patented Apr. 5, 1887.

Witnesses.
E. Planta.
L. N. Möller.

Inventor.
Robert L. Walker (No Model.)

R. L. WALKER.
LINING FOR FURNACES.

No. 360,494. Patented Apr. 5, 1887.

Witnesses.

Inventor.

Robert L. Walker (No Model.) 4 Sheets—Sheet 3.
R. L. WALKER.
LINING FOR FURNACES.
No. 360,494. Patented Apr. 5, 1887.
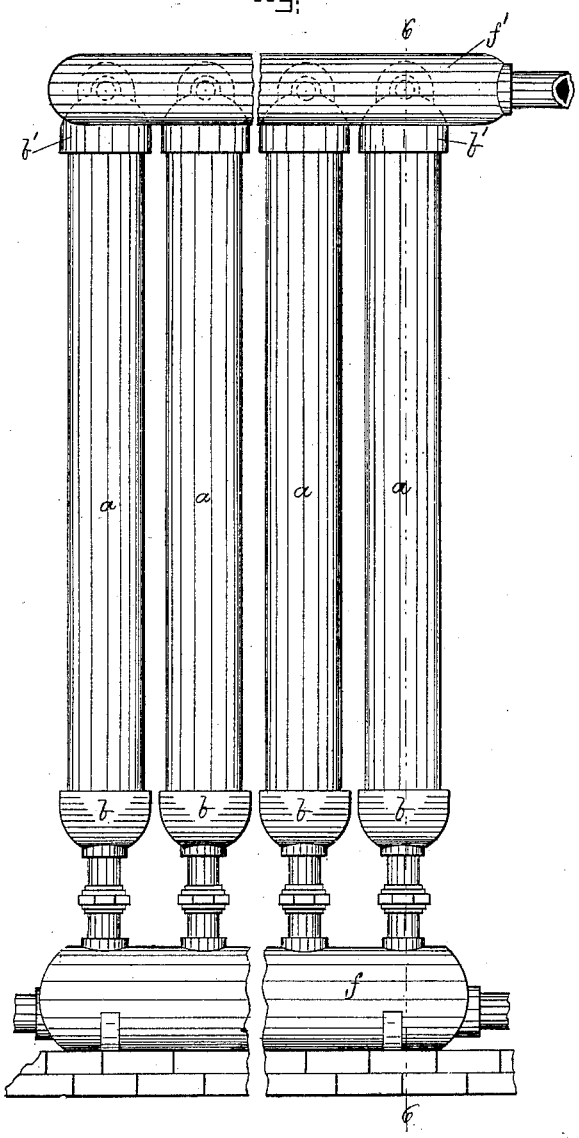
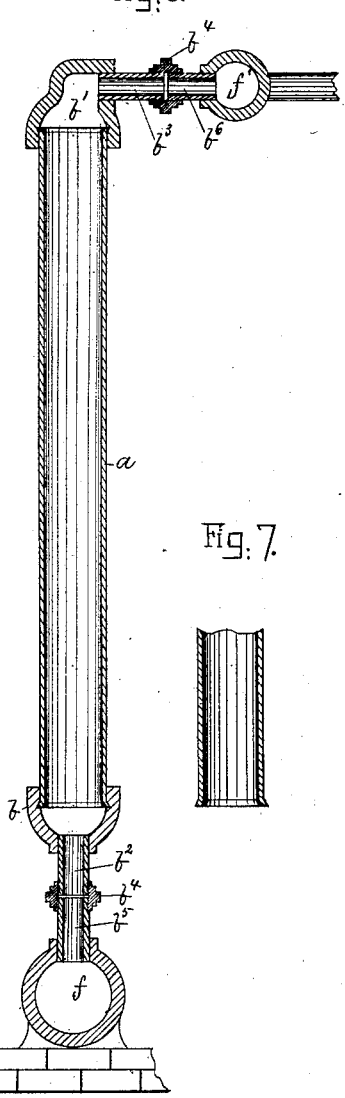
Witnesses.
Inventor
Robert L. Walker (No Model.) 4 Sheets—Sheet 4.

R. L. WALKER.
LINING FOR FURNACES.

No. 360,494. Patented Apr. 5, 1887.

Witnesses.
E. Planta.
L. N. Möller.

Inventor
Robert L. Walker

UNITED STATES PATENT OFFICE.

ROBERT L. WALKER, OF BOSTON, MASSACHUSETTS, ASSIGNOR OF ONE-HALF TO WILLIAM LUMB, OF SAME PLACE.

LINING FOR FURNACES.

SPECIFICATION forming part of Letters Patent No. 360,494, dated April 5, 1887.

Application filed June 7, 1886. Serial No. 204,433. (No model.)

*To all whom it may concern:*

Be it known that I, ROBERT L. WALKER, of Boston, in the county of Suffolk and State of Massachusetts, have invented a new and useful Lining for Furnaces, of which the following is a specification, reference being had to the accompanying drawings, making a part hereof.

My invention is an improvement upon the furnace-linings shown in my Patent No. 75,817, of 1868; and its main features relate to preventing the practical troubles arising from unequal expansion and contraction of the water-linings.

In my patented furnace-linings the water-spaces were formed by cores, the linings being castings cored out to form such water-spaces; hence the walls of the water-spaces varied in thickness in spite of the utmost care to set and hold the cores true, and the practical result was, that the linings would crack when in use in the furnace.

Figure 1:
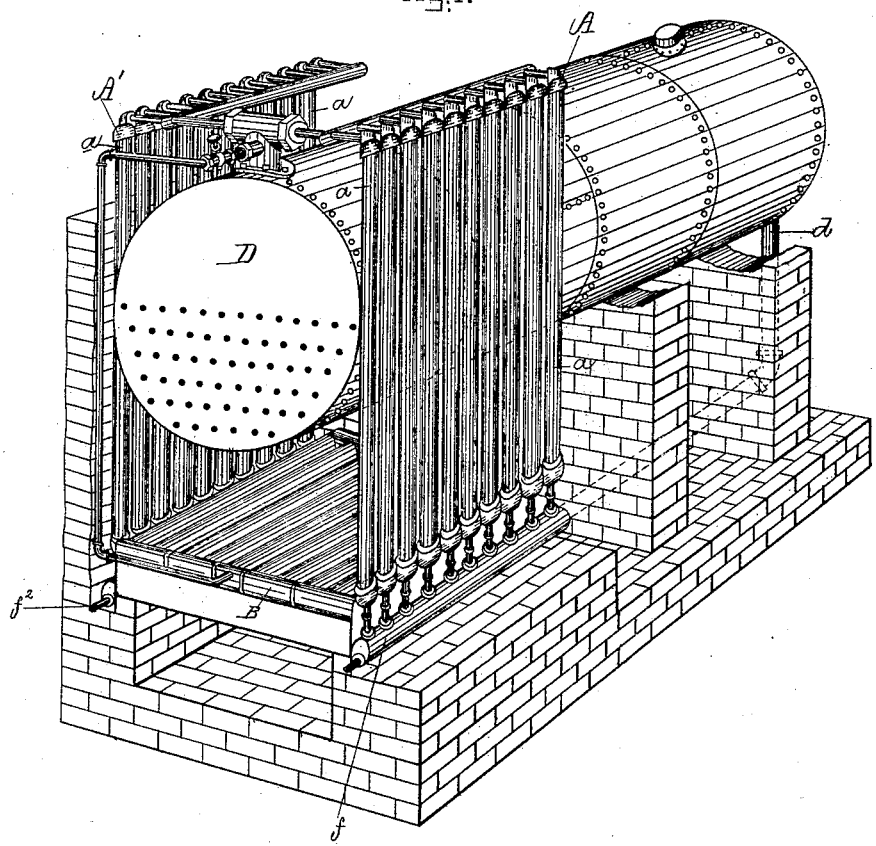
Figure 2:
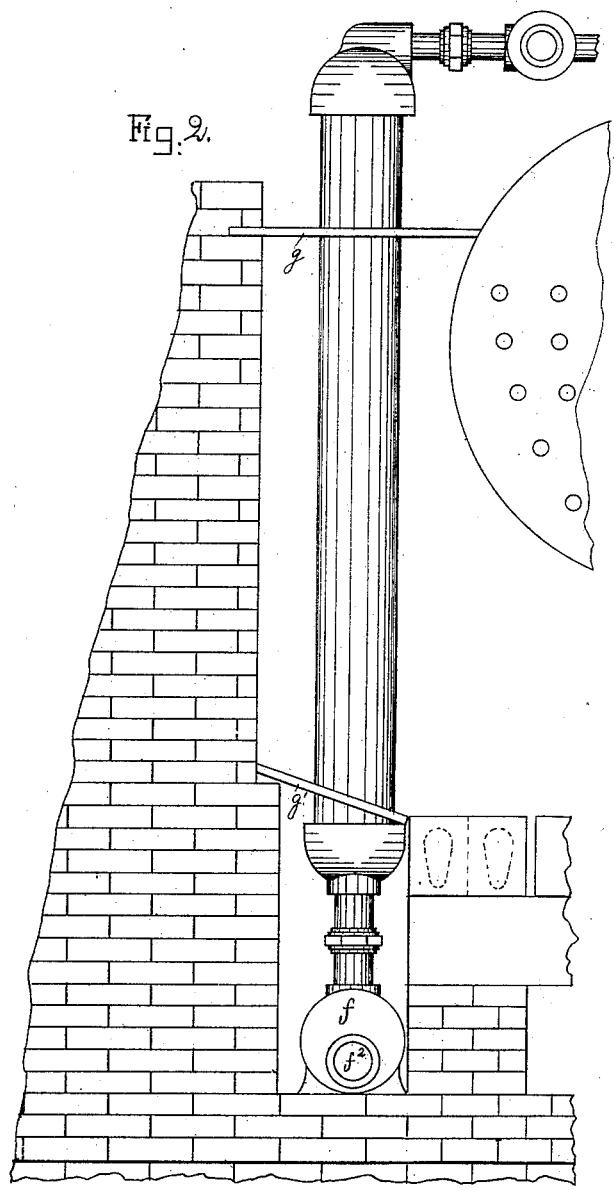
Figure 3:
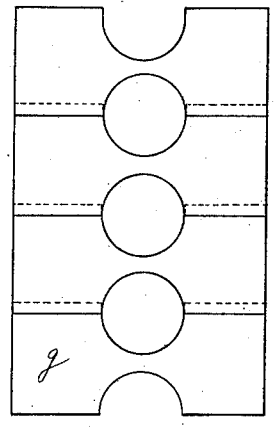
Figure 4:
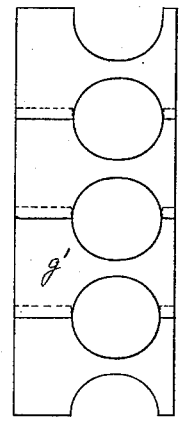
Figure 8:
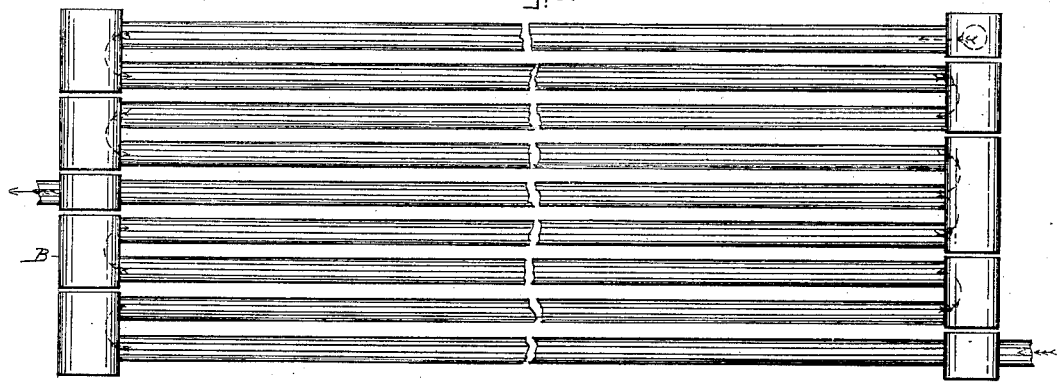
Figure 9:
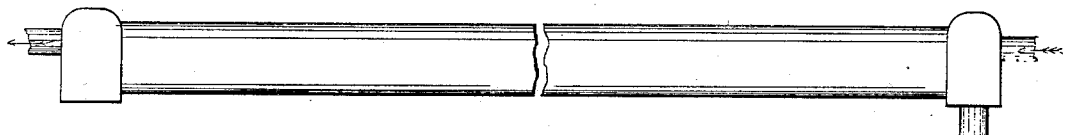
Figure 10:
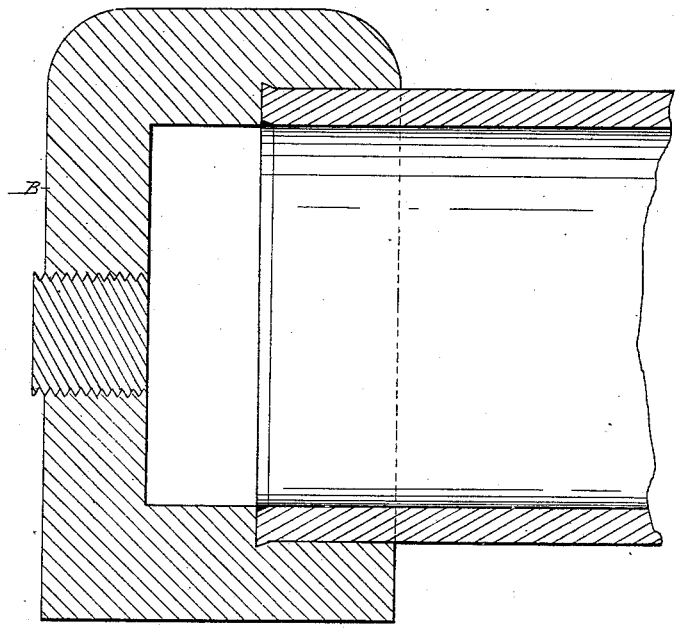
Figure 11:
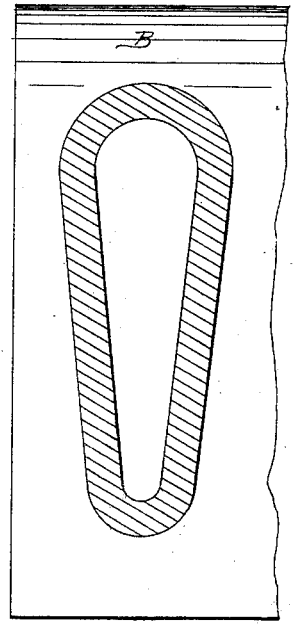

In the drawings, Figure 1 is a perspective explanatory of a furnace with my improved water-linings, and also illustrating the water-connections. Fig. 2 is a partial front elevation. Figs. 3 and 4 are plan views of the plates used with the said linings. Fig. 5 is a partial side elevation of one of the side linings. Fig. 6 is a section on line 6 6 of Fig. 5. Fig. 7 is a section showing one end of the wrought-iron pipe used for the side linings. Fig. 8 is a plan of a part of the grate or bottom lining. Fig. 9 is an edge view of Fig. 8. Figs. 10 and 11 are sectional views, full size, showing the shape of the wrought-iron pipes used in the grate.

In the drawings, A A' represent the side linings and B the bottom lining or grate of the furnace, and D the boiler. The pipe $d$ leads from the water-space or bottom of the boiler, and from this pipe $d$ smaller pipes extend to the lower drums, $f$, of the side linings and to the sections of the grate, as will be clear to all skilled in the art without detailed description.

Each lining is composed of a number of wrought-iron pipes, each of which is expanded at its ends, and has each of its ends coated with tin, nickel, copper, or the like, applied by the usual tinning process or by a battery. In practice I prefer the tinning process as cheaper; but I found electroplating to answer well. By means of this compound pipe I not only do away with the cracking of the water-linings, but also am enabled to make the main walls of the water-spaces very much thinner than was possible in my old style of furnace, and also get more air-space in the grate or bottom lining.

The heads $b\ b'$ of the side-lining pipes are bored and tapped to receive the pipes $b^2\ b^3$, by which and the unions $b^4$ and pipes $b^5\ b^6$ each compound pipe in the side lining is connected to the drums $f$ and $f'$.

The main feature of my invention consists in that construction of the water-lining for a furnace—namely, a series of pipes connecting two drums, $f$ and $f'$, by means of connecting-pipes and unions. In this construction of water-lining any imperfect pipe can be removed and replaced without disturbing the others, and when the pipes $b^3\ b^6$ are at an angle with the main pipes full provision is afforded for the expansion and contraction of the main pipes. This compound pipe, when used for a bottom lining or grate-bar, is best flattened, as shown in Fig. 11, whereby three important functions are performed—that is, the main pipe is better adapted to support the weight of the fuel, a better air-space is afforded between the pipes, and a free discharge of ashes is provided.

For use as grate-bars I prefer to cast two or more pipes into one head, as illustrated in that form of a section of grate-bars shown in Fig. 8, for the reason that in casting a section for the grates or bottom linings it is more convenient to unite a number of pipes at one casting, as illustrated in Fig. 8, than to make each compound pipe independent, as shown in the side lining.

In Fig. 8 the central group shows three pipes joined at one end by a single casting. The middle pipe of this group has its head cast upon it. This section also shows pipes in pairs, with one head cast upon a pair at one end, while a head at the other end joins one member of one pair to one member of another pair.

Founders will understand without description the molding and casting of the compound pipe, whether with independent heads, as in side linings, or with heads uniting two or more pipes, as in the grate-section.

In Figs. 2, 3, and 4 I show plates $g\ g'$, of cast-iron. The plates $g$ extend between the boiler and the side wall of the furnace, and in practice the top of the boiler and the pipes above the plates are covered by some non-conducting substance, as will be understood without description. The plates $g'$ bridge over the space between the grate and the side wall of the furnace. (See Fig. 2.)

The blow-off cocks $f^2$ from the drums $f$ are used to clear the boiler of sediment which collects in the drums $f$.

What I claim as my invention is—

1. In combination, a series of pipes, $a$, heads $b\ b'$, couplings $b^2$, $b^3$, $b^4$, $b^5$, and $b^6$, and drums $f\ f'$, substantially as described.

2. In a steam-boiler furnace, the two side linings and the bottom lining or grate, each composed of a series of wrought pipes with cast heads, substantially as shown, in combination with the plates $g\ g'$, all substantially as described.

ROBERT L. WALKER.

Witnesses:
EDWARD S. BEACH,
JOHN R. SNOW.